US007382226B2

(12) United States Patent
Monnier

(10) Patent No.: US 7,382,226 B2
(45) Date of Patent: Jun. 3, 2008

(54) DEVICE FOR LIMITING ACCESS TO A CONFINED SPACE

(75) Inventor: Jean-Luc Monnier, La Chaux-de-Fonds (CH)

(73) Assignee: Mr Eletronic Sa, Wetzikon (CH)

( * ) Notice: Subject to any disclaimer, the term of this patent is extended or adjusted under 35 U.S.C. 154(b) by 807 days.

(21) Appl. No.: 10/527,897

(22) PCT Filed: Mar. 13, 2002

(86) PCT No.: PCT/CH02/00150

§ 371 (c)(1),
(2), (4) Date: Sep. 19, 2003

(87) PCT Pub. No.: WO02/075668

PCT Pub. Date: Sep. 26, 2002

(65) Prior Publication Data

US 2005/0264409 A1 Dec. 1, 2005

(30) Foreign Application Priority Data

Mar. 20, 2001 (EP) ................................ 01810281

(51) Int. Cl.
*H04Q 9/00* (2006.01)
*G05B 19/02* (2006.01)
*G08B 23/00* (2006.01)

(52) U.S. Cl. ............... 340/5.73; 340/5.74; 340/825.22; 340/500

(58) Field of Classification Search ............... 340/5.73, 340/5.74, 825.22, 500, 825.31, 825.32
See application file for complete search history.

(56) References Cited

U.S. PATENT DOCUMENTS

| | | | | |
|---|---|---|---|---|
| 4,155,073 | A * | 5/1979 | Ulch et al. | 714/715 |
| 5,475,378 | A | 12/1995 | Kaarsoo et al. | 340/5.6 |
| 5,488,358 | A * | 1/1996 | Hamilton et al. | 340/5.26 |
| 5,488,660 | A | 1/1996 | Dawson et al. | 713/182 |
| 5,774,058 | A | 6/1998 | Henry et al. | 340/5.5 |
| 6,445,281 | B1 * | 9/2002 | Monnier | 340/5.1 |

FOREIGN PATENT DOCUMENTS

| | | |
|---|---|---|
| EP | 0 668 423 A | 8/1995 |
| EP | 0 985 790 | 3/2000 |
| WO | WO 96/05552 A | 2/1996 |
| WO | WO 01/08107 | 2/2001 |

* cited by examiner

*Primary Examiner*—Brian Zimmerman
*Assistant Examiner*—Scott Au
(74) *Attorney, Agent, or Firm*—Townsend M. Belser, Jr.; Nexsen Pruet, LLC

(57) ABSTRACT

A lock (10, 40, 42, 58) for security devices 26, such as banknote dispensers, to limit access to a confined space (32, 34) within the device. A remote computer (28) exclusively controls opening of the lock (10, 40, 42, 58). A plurality of the devices may form a network controlled by the remote computer (28).

13 Claims, 1 Drawing Sheet

DEVICE FOR LIMITING ACCESS TO A CONFINED SPACE

BACKGROUND OF THE INVENTION

1) Field of the Invention

Figure 1:
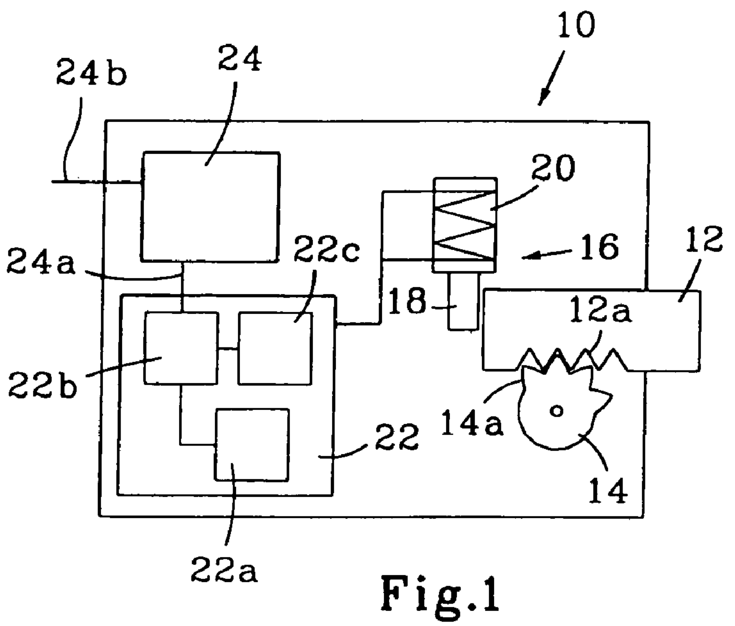

The present invention concerns locks for limiting access to a confined and secured space, banknote dispensing devices and machines, and networks formed of devices fitted with such locks.

It concerns more particularly a "lock of the type including:

- a bolt, capable of occupying first and second positions in which it is respectively possible or impossible to access the confined space,
- an electromechanical device, for allowing or preventing the bolt from moving from one of the bolt positions to the other,
- a control circuit for addressing commands to the electromechanical device, and
- a communication interface provided with a terminal forming an input to the lock, and arranged so as to be able to be connected, via the terminal, at least indirectly, to a computer type management system.

2) Description of Related Art

Such locks are used, for example, in banknote dispensing apparatus, better known by the name "cash dispensers", in controlling the opening of hotel rooms or in bank vaults, for controlling safes.

In the known systems, such as those described, for example, in EP Patent Application No. 0 985 790, the means for controlling the lock include a microprocessor, a memory and a keyboard, arranged such that, in order to access the confined space, an operator enters an access code by means of the keyboard. The microprocessor checks this code, as a function of information that it will search for in the memory, and gives or does not give the command to release the bolt.

In the aforementioned Patent Application, the code entered by the operator is different each time. This code is generated synchronously by the lock microprocessor and by a computer external to the lock, generally placed at the head office of the company responsible for accessing the confined space. The code originating from the external computer is transmitted to the operator when he starts visiting the cash dispensers, or by telephone before he accesses a given cash dispenser.

Various variants of locks connected to a computer are described in U.S. Pat. Nos. 5,774,058, 5,448,660 and 5,475,378, WO 96-05552 and EP 0,668,423. In these documents, the lock is, generally, fitted with a keyboard and a screen, to allow an operator, responsible for accessing the confined space protected by the lock, to take an active part in controlling the lock.

SUMMARY OF THE INVENTION

With such solutions, each lock includes autonomous processing means. It is thus not possible to provide remote control. However, it appears that the security of the persons involved in controlling the confined space and that of the objects located therein would be considerably improved if the lock could only be operated when it receives a command from a place located somewhere other than on the site where the apparatus is located. In order to be able to guarantee secure remote control, a reliable and practically inviolable communication protocol is necessary.

It is an object of the present invention thus to allow more secure control of access to confined and secured spaces. This object is achieved owing to the fact that the communication interface and the control circuit are arranged such that the data originating from outside the lock and addressed to the input terminal conform to the following protocol:

- a first pulse train defining the device concerned;
- a second pulse train defining the total length of the message;
- a third pulse train including data relating to the command; and
- a fourth pulse train for checking that there are no errors.

Advantageously, the control circuit includes:

- a memory in which there is stored at least one item of data in correlation with a code capable of commanding the lock to open,
- means for comparing the data and the code, and
- a pulse generator for operating the electromechanical device when there is a match between the code received and the stored data.

Such a solution guarantees secure access that does not necessarily require permanent monitoring by the management system.

In order to allow the lock history, maintenance and surveillance to be monitored remotely, the memory is arranged to store, in addition, data relating to the last operations carried out. Moreover, the control circuit is arranged so as to be able to address data relating to such operations to the management system, when it is commanded to do so.

In such devices, it is safer for the opening command to be given without directly involving the operator in the control of the operation. This is why, advantageously, the interface is exclusively connected to the management system.

The present invention also concerns security devices for controlling access to a confined and secured space. It relates more particularly to a device including:

- a lock, of the type controlled by an access code, arranged for limiting access to the space and including a control circuit and a communication interface,
- data input means allowing an operator to enter the access code,
- a coordination device connected to the lock and to the data input means, and provided with a connection for connecting the lock to a computer type management system.

In order to ensure a reliable and secure connection between the management system and the device, the coordination device, the interface and the control circuit are arranged such that they communicate with each other in accordance with a protocol including:

- a first pulse train defining the device concerned,
- a second pulse train defining the total length of the message,
- a third pulse train including data relating to the command, and
- a fourth pulse train for checking that there are no errors.

A device of this type is well suited to simultaneous monitoring of several locks. It therefore further includes a bus connecting the locks to the coordination device.

The device described hereinbefore finds application in the field of cash dispensers, which include:

- a cash box defining a confined space intended to contain the notes, and provided with a door,
- a lock of the type controlled by an access code, for allowing or preventing the door from opening and thus limiting access to the cash box,

- a dispensing mechanism for removing the notes from the cash box,
- data input means allowing an operator to address commands to the cash dispenser,
- a coordination device connected to the data input means, and
- connecting means for connecting the coordination device to a management system.

In order to allow real time monitoring and management of the cash dispenser, while simplifying the structure of its lock, and guaranteeing reliable and secure relations, the lock is connected to the coordination device from which it receives access code carrier signals. In this cash dispenser, the lock and the management system communicate with each other in accordance with a protocol including:

- a first pulse train defining the device concerned,
- a second pulse train defining the total length of the message,
- a third pulse train including data relating to the command, and
- a fourth pulse train for checking that there are no errors.

Advantageously, the management system, the coordination device and the cash dispenser lock are arranged such that the data originating from the management system prevails over that originating from the data "input means. Consequently, it is possible to prohibit access to a cash dispenser if a doubt arises, from the management system, even during the cash box opening procedure.

In order to ensure optimum working conditions, devices such as those described hereinbefore are advantageously integrated in a management network for controlling access to confined and secured spaces. In this network, each device includes:

- a lock for limiting access to the confined space, the lock including:
  - an electromechanical device arranged for allowing or preventing access to said space,
  - a control circuit including a memory in which there is stored at least one data item in correlation with a code capable of commanding the lock to open, means for comparing the data and the code, and a pulse generator for operating the electromechanical device when there is a match between the code received and the stored data,
- data input means arranged to allow an operator to enter the access code, and
- a coordination device connected to the lock and to the data input means.

In this network, the control circuit and the coordination device are arranged such that the confined space is only accessible if the access code matches the memory data, and the computer does not prevent access. In order to guarantee a secure and reliable connection, the computer and the lock communicate with each other in accordance with a protocol including:

- a first pulse train defining the device concerned,
- a second pulse train defining the total length of the message,
- a third pulse train including data relating to the command, and
- a fourth pulse train for checking that there are no errors.

Advantageously, and in order to increase security, the control circuit of each of the devices is arranged such that it only address control pulses if the code matches the stored data and the computer gives its agreement.

BRIEF DESCRIPTION OF THE DRAWING(S)

Figure 2:
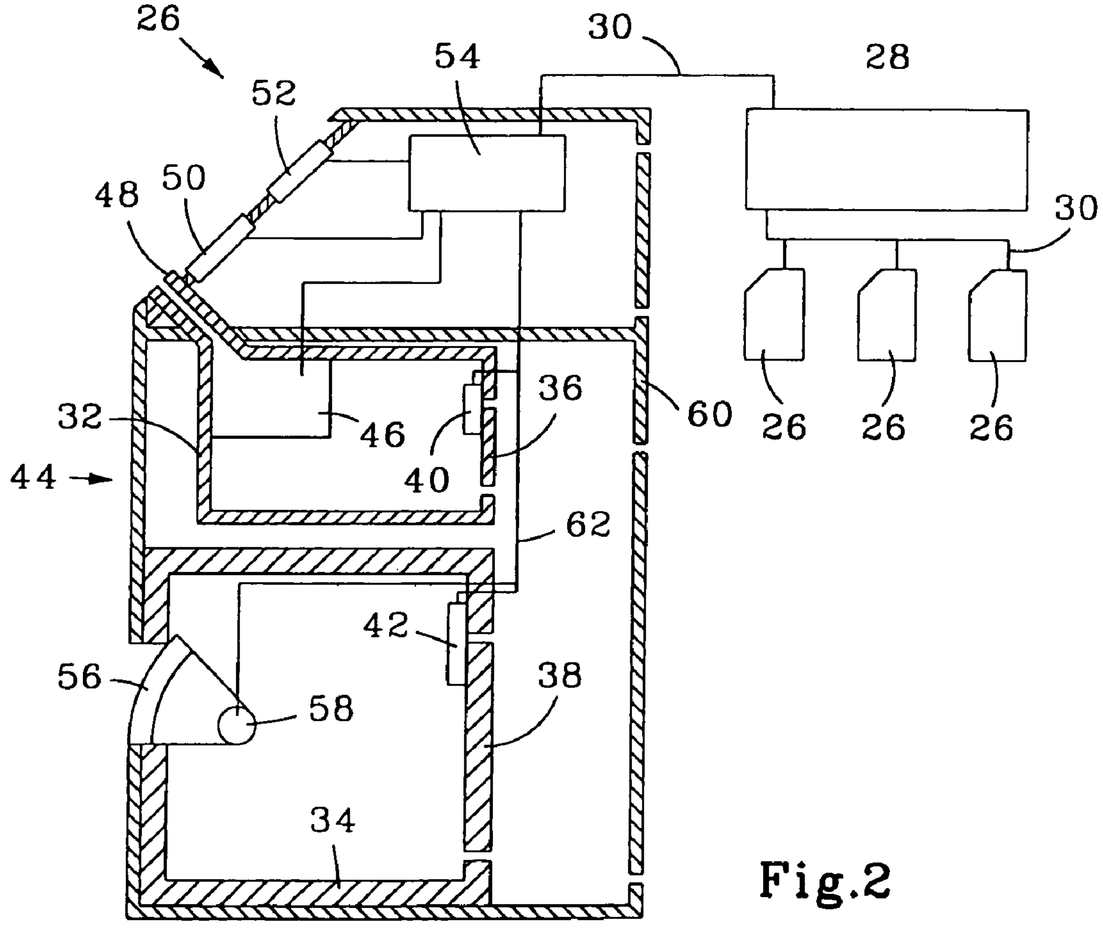

Other features and advantages of the invention will appear from the following description, made with reference to the annexed drawing, in which:

FIGS. 1 and 2 show, according to the invention; respectively and schematically, a lock and a cash dispenser network.

DETAILED DESCRIPTION OF THE INVENTION

FIG. 1 shows a lock 10, which includes a bolt 12 capable of occupying a first, and second position, one of which, called the closed position, is for preventing access to a confined space, for the purpose of securing said space. It is provided with a rack or toothed part 12*a*. The movement of bolt 12 is ensured by a control lever 14, accessible from outside the confined space and provided with a toothed sector 14*a* meshed with toothing 12*a*.

Lock 10 further includes an electromechanical device 16 provided with a stop 18 and an electromagnet 20 controlling the movement of stop 18, which impedes or allows the movement of bolt 12. The device is controlled by a circuit 22, which receives commands from an interface 24, provided with a first terminal 24*a* connected to control circuit 22 and a second terminal 24*b*, for allowing connection with the exterior, as will be explained hereinafter.

Circuit 22 essentially includes a memory 22*a*, in which data is stored, a comparison circuit 22*b*, for comparing the data received from interface 24 with that stored in memory 22*a*, and a pulse generator 22*c*, arranged such that, if the data received in reference matches the memory data, it gives the command to electromagnet 20 to release bolt 12. Advantageously, memory 22*a* can also store data relating to the last operations carried out on lock 10.

All the elements of the lock, with the exception of control lever 14 and output 24*b* of interface 24, are inside the confined space.

FIG. 2 shows schematically a management network for a set of security devices 26 for controlling access to confined and secured spaces, which will be described in more detail hereinafter, and a management system essentially including a central computer 28 and connecting means 30, generally formed of a cabled network.

This Figure shows in detail only one of security devices 26. It includes two confined spaces defined by cash boxes 32 and 34, respectively fitted with doors 36 and 38 and locks 40 and 42 of the type described with reference to FIG. 1.

Cash box 32 forms an integral part of a cash dispenser 44. It contains a note dispensing mechanism 46. The notes are delivered through a slot 48.

Cash dispenser 44 further includes data input means 50 formed of a keyboard and a magnetic or smart card reader, and display means formed by means of a screen 52.

A coordination device 54, advantageously formed of a microprocessor, receives the commands given by data input means 50 and interprets them in order to operate mechanism 46 and screen 52.

Coordination device 54 is permanently connected to computer 28, via network 30, in order to monitor transactions and, if necessary, to interrupt them if a problem or fraudulent use is observed. Data is transmitted using a high security encoded language. It should be noted that one or more security devices 26 can be connected by a same line 30 to central computer 28.

Cash box 34 is a night depository with a swiveling door 56, allowing boxes that are not shown in the drawing to be inserted therein, controlled by a lock 58.

Security device 26 is arranged in a box 60 fitted with doors and cut out portions that are not referenced, to allow access to cash boxes 32 and 34, slot 48, door 56 and data input means 50 and screen 52.

As appears in FIG. 2, locks 40, 42 and 58 are connected, by means of a bus 62, to coordination device 54 and, via said device, to central computer 28. The connection between the locks and device 54 can be achieved by means of a four-wire line, such as those used in the field of telephony.

If an operator has to command one or other of locks 40, 42 or 58 to open, he addresses a message to the coordination device via data input means 50, for example by means of a card and/or a figure entered on the keyboard. This message contains data relating to the identity of the operator, the lock concerned and the code which, when compared to the data contained in memory 22*a*, allows access to one of the confined spaces.

Since data input means 50 are connected both to locks 40, 42 and 58 and to central computer 28, via coordination device 54, the message can be analyzed by central computer 28 before the lock concerned is opened. Authorization to open can be given in real time, which means that each time a message enters, computer 28 analyzes it and either gives its agreement or does not. Authorization may also be given in advance, in which case computer 28 gives coordination device 54, in advance, the indications relating to the messages that have to be taken into account.

Transmission of data between locks 40, 42 and 58 and coordination device 54 is achieved in accordance with a protocol including:

- a first pulse train T1 defining the lock concerned, with an indication as to whether it is transmitting or receiving,
- a second pulse train T2 defining the total length of the message,
- a third pulse train T3 including data relating to the command transmitted, and
- a fourth pulse train T4 for checking that there are no errors.

The length of T1, T2 and T4 is fixed, generally 8 bits (or 1 byte). In most cases, this is sufficient to meet requirements. However, the length of T3 is variable and can have up to 255 bytes. If that is not enough, the message can be broken down. This may, for example, be necessary when computer 28 asks a lock to transmit to it the data relating to the last operations carried out on the locks.

This solution not only allows security to be increased in the control of access to confined spaces, since the locks can be permanently monitored, but also allows their cost to be reduced, since the internal control means can be limited. It is thus no longer necessary to ask an operator, who has to go to the site, to interrogate control circuit 22 to find out the last operations carried out on one or other of the locks. This can occur either in real time, or periodically. There is no risk either of a door remaining open inadvertently or by erroneous handling.

The programs contained in computer 28 relate both to the dispensing of banknotes and to the management of the locks. It is also possible, via a network that is not shown in the drawing, for the computer to address data relating to the dispensing of notes to a first computer and data relating to the locks to a second, the persons responsible for these two aspects being different.

It should be noted that the connection between coordination device 54 and computer 28 is subject to the greatest care in known systems and the addressed messages thus have to be encoded with a maximum of security. Consequently, the risk of intervention on the line in order to open the lock in an unauthorized manner is practically nil.

The network described with reference to FIG. 2 relates to the dispensing of banknotes and to the management of night depositories. It goes without saying that the means implemented could be used for other purposes, particularly for managing safes in a bank safe deposit vault.

The invention claimed is:

1. A lock for limiting access to a confined and secured space within an apparatus, said lock comprising:

- a bolt capable of occupying first and second positions in which it is respectively possible or impossible to access said confined space,
- an electromechanical device for allowing or preventing the bolt from moving from one of said positions to the other,
- a mechanical unit manipulatable from outside of said confined space so as to move said bolt from one of said positions to the other when said movement is allowed by operation of said electromechanical device,
- a control circuit for addressing commands to the electromechanical device, and
- a communication interface connected to said control circuit and provided with a terminal adapted to be connected, at least indirectly, to a computer remote from said apparatus, wherein said control circuit is arranged so that said electromechanical device can be operated only when said interface terminal has received a command from said remote computer, which thereby exclusively controls access to said confined space, wherein all elements of said lock are arranged to be placed entirely within said confined space, except for said interface terminal, and
- wherein said interface and the control circuit are arranged such that the data originating from outside the lock and addressed to the input terminal conform to a protocol including:
- a first pulse train defining the device concerned,
- a second pulse train defining the total length of the message,
- a third pulse train including data relating to the command transmitted, and
- a fourth pulse train for checking that there are no errors, wherein the lengths of the first, second and fourth pulse trains are fixed and the length of the third pulse train is variable.

2. A lock according to claim 1, wherein said control circuit includes:

- a memory in which there is stored at least one item of data in correlation with a code capable of commanding the lock to open,
- means for comparing the data and the code, and
- a pulse generator for operating the electromechanical device when there is a match between the code received and the stored data.

3. A lock according to claim 2, wherein said memory is also arranged for keeping data relating to the last operations carried out and wherein said control circuit is arranged to address data relating to said operations to said management system when it is commanded to do so.

4. A lock according to claim 2, wherein said interface is arranged to be exclusively connected to said remote computer.

5. A lock according to claim 3, wherein said interface is arranged to be exclusively connected to said remote computer.

6. A lock according to claim 1, wherein said interface is arranged to be exclusively connected to said remote computer.

7. A security device for controlling access to a confined and secured space comprising:

the lock of claim 1, wherein said lock is controlled by an access code provided by said remote computer and arranged to limit access to said space, data input means allowing an operator to enter said code, and connecting means comprising a coordination device connected to the data input means and provided with a connection for connecting said coordination device to said remote computer and to a said terminal of the communication interface and wherein the coordination device.

8. A security device according to claim 7, wherein said coordination device and said lock are arranged such that, unless prohibited by said remote computer, said lock can be opened by said operator by acting on the data input means to enter said code.

9. A security device according to claim 8, wherein it includes a plurality of locks and a bus connecting said locks to said coordination device.

10. A cash dispenser comprising:

a cash box defining a confined space intended to contain said cash notes, and provided with a door, the lock of claim 1, wherein said lock is controlled by an access code for allowing or preventing the door from opening and thus limiting access to said cash box, a dispensing mechanism for removing the notes from the cash box, data input means allowing an operator to address commands, and connecting means comprising a coordination device connected to said data input means and to said terminal of the communication interface.

11. A dispenser according to claim 10, wherein the remote computer, the coordination device and the lock are arranged such that the data originating from the remote computer prevails over the data originating from the data input means.

12. A management network for a plurality of security devices for controlling access to a plurality of confined and secured spaces comprising a network for connecting each of said security devices to a computer remote from said security devices, wherein each security device comprises:

the lock of claim 1 for limiting access to a corresponding one of said confined spaces, wherein the control circuit includes a memory in which there is stored at least one data item in correlation with a code capable of commanding the lock to open, means for comparing the data and the code and a pulse generator for operating the electromechanical device when there is a match between the code received and the stored data, data input means arranged to allow an operator to enter the access code, and connecting means comprising a coordination device connected to the data input means and to said terminal of the communication interface, wherein the control circuit and said coordination device are arranged such that said corresponding space is only accessible if the code matches said data and said remote computer does not prevent access.

13. A network according to claim 12, wherein said control circuit is arranged such that it only addresses the control pulses if said code matches the stored data and if the remote computer (28) gives its agreement.

* * * * *

UNITED STATES PATENT AND TRADEMARK OFFICE

CERTIFICATE OF CORRECTION

PATENT NO. : 7,382,226 B2
APPLICATION NO. : 10/527897
DATED : June 3, 2008
INVENTOR(S) : Jean-Luc Monnier It is certified that error appears in the above-identified patent and that said Letters Patent is hereby corrected as shown below:

On the title page item (73), should read:
(73) Assignee: MR Electronic SA

Signed and Sealed this

Twelfth Day of August, 2008

JON W. DUDAS
*Director of the United States Patent and Trademark Office*